Dec. 26, 1967   R. A. D'ARENA   3,359,937

AMPHIBIOUS MOTOR SCOOTER

Filed April 19, 1966

INVENTOR:
RUGGERO D'ARENA

By Keith D. Beecher
ATTORNEY

United States Patent Office 3,359,937
Patented Dec. 26, 1967

3,359,937
AMPHIBIOUS MOTOR SCOOTER
Ruggero A. D'Arena, P.O. Box 219,
Woodacre, Calif. 94973
Filed Apr. 19, 1966, Ser. No. 543,650
5 Claims. (Cl. 115—1)

ABSTRACT OF THE DISCLOSURE

An amphibious motorcycle is described in the present specification. The motorcycle includes a pair of flotation tanks which are hinged to the sides of the vehicle, and which spread out from the frame and float as the vehicle enters the water. The flotation tanks provide buoyancy and stability for the vehicle in the water. The flotation tanks have a wing-like configuration, and they act like stirrups, when the vehicle is on the land, serving to protect the legs of the rider from brush and the like.

---

The present invention relates generally to amphibious vehicles and its relates particularly to an improved amphibious motor scooter, or motor cycle, which is especially constructed so that it may be driven over rugged terrain and on water.

The embodiment of the amphibious motor scooter to be described includes flotation tanks which are mounted on both sides of the frame of the vehicle. These tanks are folded down along the sides of the frame when the scooter is driven over land, and may be held in that position by gravity, or by latches, or other fasteners. The flotation tanks spread out from the frame and float as the vehicle enters the water.

The frame of the vehicle is made, for example, to enclose an internal volume, and to be itself capable of floating on the water so as to provide buoyance for the scooter. The flotation tanks also provide buoyance and stability for the scooter when it is in water.

The flotation tanks have a wing-like configuration, and they also serve an ancillary purpose of protecting the legs of the rider from brush and the like when he travels over land. However, the tanks are constructed, as will become evident as the description proceeds, somewhat like stirrups, so that the legs of the rider are at all times free. The rider can, therefore, stick his legs out, or place his foot on the ground for balancing purposes, when on land, as with the usual type of motor scooter or motor cycle.

A feature of the embodiment of the invention to be described is that it is driven by jet pump, when in the water, rather than by a propeller. This enables the vehicle to be used in shallow waters and swamp areas without any problem of propeller damage or fouling.

An object of the invention, therefore, is to provide an improved amphibious vehicle, such as a motor scooter, which is easy to ride and manipulate, and which can be driven on land or on water with equal ease.

Another object of the invention is to provide such an improved amphibious vehicle which is rugged and durable in its construction, and yet which is relatively easy to fabricate and economical in cost.

Another object of the invention is to provide such an amphibious vehicle having lateral and longitudinal stability, so as to be easy to control in rough terrain, and which exhibits good balance and stability in water.

A constructed embodiment of the improved vehicle of the invention, in the form of an amphibious motor scooter, is capable of speeds, for example, up to 55 miles per hour on land, and up to 30 knots in water. This renders the vehicle particularly suited for hunters, fishermen and sportsmen in general. The vehicle is also useful in law enforcement and for civil defense or military purposes.

The constructed embodiment provides for the body, or frame, of the vehicle to be low to the ground so that it may be made to climb over logs and steep sand banks with facility. Also, the wheel base of the constructed embodiment is made relatively short so that the vehicle is able to take bumps and rocks with no appreciable damage.

As mentioned above, a non-propeller system is preferred, the constructed embodiment being powered by a centrifugal jet pump which is propelled, for example, by a ten horsepower motor.

It is intended for the rear wheel of the vehicle to turn when the vehicle is in water, so as to produce a balancing gyroscopic effect. The vehicle may be steered in the water by means of a flexible nozzle extending from the jet pump. The nozzle may be coupled to the handle bars of the vehicle, so that the handle bars can be used for steering on land or in water.

Other objects, features and advantages of the invention will become apparent from a consideration of the following description, when the description is taken in conjunction with the accompanying drawings, in which.

Figure 1:
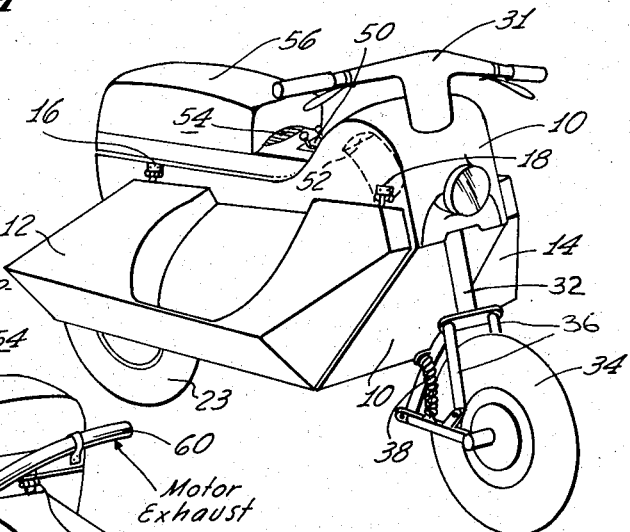
FIGURE 1 is a perspective view of a motor scooter constructed in accordance with the invention taken from the front and from one side.
Figure 2:
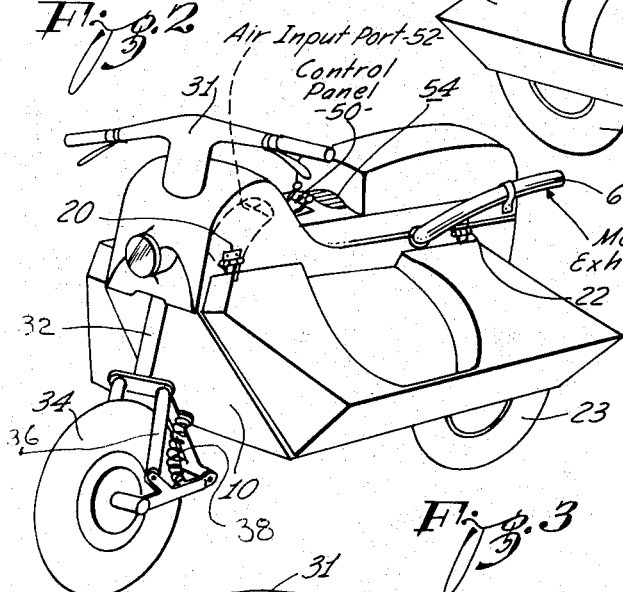
FIGURE 2 is a second perspective view of the vehicle, taken from the front and from the other side.

As noted above, a 10-horsepower engine is used in a constructed embodiment. This engine is coupled to the rear wheel of the scooter, so that the wheel may be driven on land and in water. The engine is also coupled to a jet pump which is used to drive the vehicle in the water. The usual controls are provided so that the drive of the wheels and the pump by the engine can be controlled by the driver.

A frame of a constructed embodiment of the invention is rigid, and the vehicle is built close to the ground. The frame is enclosed, for example, in a completely waterproof hull of aluminum or Fiberglas for providing the desired buoyancy in water. Fiberglas is preferred at present, because of the tendency of aluminum to oxidize. When the machine is built close to the ground, it can be made to climb over logs and up steep banks, with the hull dragging on the ground and acting as a skid.

As noted above, the wheel base of the scooter is preferably short in relation to the usual motor scooter. It has been found that with a long wheel base, there is a greater tendency to damage when the vehicle hits rocks or bumps, and the vehicle is harder to handle.

It is preferable, as noted, that the rear wheel of the vehicle be turned when the vehicle is in water, so as to provide a balancing gyroscopic effect which enhances balance and stability.

The front tire is preferably smooth and of a circular cross-section, rather than squared-off. It has been found that a squared-off front tire makes it difficult to turn when climbing hills.

The constructed embodiment includes a tubular frame which defines a hull of sufficient volume so as to comprise the major portion of the flotation capabilities of the vehicle. The hull, as pointed out, may be composed of molded Fiberglas. The flotation tanks, likewise, may be composed of molded fiberglass, or other suitable material.

An indirect chain drive to the rear wheel is preferable, so that a waterproof bearing seal can be conveniently incorporated into the assembly to keep the engine dry.

As shown in the drawing, the illustrated embodiment of the invention includes a body or hull 10, the hull being composed of any appropriate material, such as aluminum or Fiberglas. The hull is made completely waterproof, and it encloses sufficient volume, so that a major portion of the buoyancy of the vehicle is provided thereby.

A pair of flotation tanks 12 and 14 are suspended from the sides of the hull 10. These flotation tanks, likewise, may be composed of Fiberglas or other suitable material, as noted above.

The flotation tank 12 is hinged at its upper edge to the hull 10 by a pair of hinges 16 and 18. Likewise, the flotation tank 14 is hinged to the hull 10 by a pair of hinges 20 and 22 at its upper edge.

Figure 3:
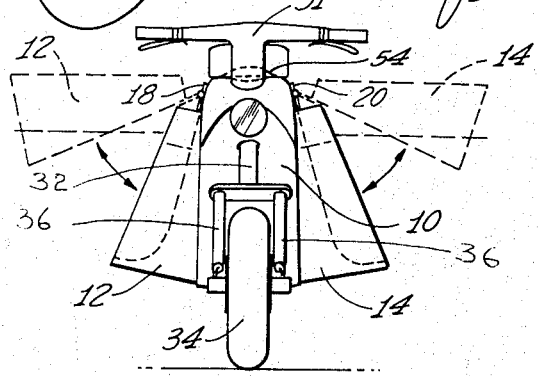
FIGURE 3 is a front elevational view showing the vehicle and the flotation tanks.
Figure 4:
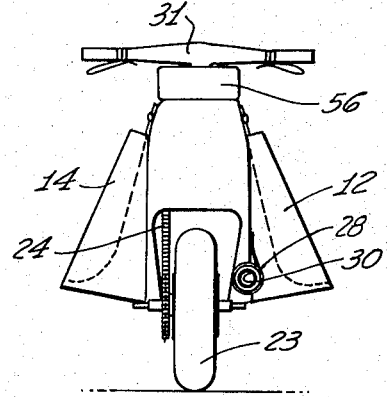
FIGURE 4 is a rear elevational view showing further details of the vehicle.

As illustrated, the flotation tanks are configured so as to receive the legs and feet of the rider, and to function somewhat in the manner of stirrups. The flotation tanks may either hang down by their own weight, when the vehicle is on land. Then, when the vehicle is driven into the water, they swing out as they are buoyed up by the water, such as shown in FIGURE 3.

It will be appreciated that when the scooter is actually being ridden in the water, the flotation tanks 12 and 14 are forced down into the water a sufficient extent by the rider's legs, so as to give the sense of stability to the vehicle, and to be in a comfortable position for the rider.

As pointed out previously, the flotation tanks 12 and 14 also serve to protect the legs of the rider from branches, bushes, and the like, when the machine is being ridden on land.

An engine (not shown), which may be air cooled, is supported on the frame of the vehicle, within the hull 10, and the engine is coupled to the rear wheel 23, for example, by a chain drive 24. The engine includes a drive shaft (not shown) which extends to the exterior of the hull through an appropriate waterproof seal, and a sprocket is supported on the end of the drive shaft, to which the drive chain 24 is coupled.

A jet pump 28 is mounted in a cowl to the rear of the vehicle, and is coupled, for example, to the rear wheel. The rear wheel is driven at all times, and when the vehicle is in water, the jet pump causes the vehicle to be propelled through the water. A flexible nozzle 30 extends from the jet pump to provide the propelling action.

The vehicle also includes a pair of handlebars 31 which are connected through a usual steering column 32 to the front wheel 34 of the vehicle. The front wheel may be suspended on the steering column by a usual hinged suspension, including shock absorbers 36 and a compression spring 38. As mentioned above, the tire of the front wheel preferably has a circular cross-section, and is smooth so as to facilitate the operation of the scooter in rough country.

The handlebars 31 may be coupled to the flexible nozzle 30, and used to turn the nozzle back and forth as the handlebars are turned, so that the handlebars may be used to navigate the vehicle in water. Of course, any other suitable means, such as a conventional rudder, may be used for navigational purposes.

The scooter has the usual controls on the hand grips of the handles 31, and further controls on a control panel 50 which is situated on the top of the hull 10. An air inlet to the engine is provided through the forward end of the hull, through an inlet port 52. This provides air cooling for the engine, with a suitable air outlet port 54 being provided under the seat 56 of the vehicle.

A motor exhaust 60 is provided, and is positioned so as to be disposed well above the water surface, when the vehicle is in the water.

The invention provides, therefore, an improved motor scooter, or the like, which is constructed to be buoyant in water, so that it may readily function as an amphibious vehicle. The motor scooter includes a buoyant hull, which provides the major portion of the buoyance when the scooter is in water. In addition, it includes a pair of flotation tanks, as described above, which spread out when the vehicle is in water, so as to provide additional buoyancy and stabilizing effects.

It will be appreciated that the concept of the invention is primarily concerned with the hull and flotation tanks of the assembly. That is, a wide range of types and models of vehicles may be employed, without departing from the spirit or scope of the invention.

Therefore, while a particular embodiment has been shown and described, modifications may be made. It is intended in the claims to cover the modifications which come within the spirit and scope of the invention.

What is claimed is:

1. An amphibious vehicle including: a frame; wheels mounted on said frame; drive means for said wheels mounted in said frame; and flotation means hinged to said frame to extend down at least one side thereof when said vehicle is on land and to spread out and float as a buoyancy means when the vehicle is in water, said flotation means including a pair of flotation tanks hinged to both sides of said frame, and in which said flotation tanks are configured to permit the legs of a rider of the vehicle to extend down the outer faces thereof and to have skirts extending out from said outer faces to protect the legs of the rider.

2. The vehicle defined in claim 1, in which said drive means includes a source of motive power and in which said source of motive power comprises an internal combustion engine.

3. The vehicle defined in claim 2 in which said source of motive power further comprises a power driven pump for propelling the vehicle through water.

4. The vehicle defined in claim 3 and which includes a flexible nozzle extending from said pump for propelling the vehicle through water and for permitting the vehicle to be steered in water.

5. The vehicle defined in claim 1 in which said frame is constructed to enclose an internal volume and to be capable of floating when the vehicle is in water.

References Cited

UNITED STATES PATENTS

| 1,180,013 | 4/1916 | Cook et al. | 115—1 |
| 2,075,785 | 3/1937 | Van Caneghem | 115—1 |
| 2,943,593 | 7/1960 | Megert et al. | 115—16 X |
| 2,949,879 | 8/1960 | Kehn | 9—6 X |
| 3,003,455 | 10/1961 | Alexander et al. | 115—12 |

FOREIGN PATENTS

| 458,631 | 7/1950 | Italy. |

ANDREW H. FARRELL, *Primary Examiner.*